Dec. 13, 1955 T. C. TAYLOR 2,726,883

SEAL FOR ROTATING SHAFT AT HIGH PRESSURES

Filed Sept. 20, 1952

INVENTOR.
Theodore C. Taylor
BY Everett A. Johnson
ATTORNEY

United States Patent Office 2,726,883

Patented Dec. 13, 1955

2,726,883

SEAL FOR ROTATING SHAFT AT HIGH PRESSURES

Theodore C. Taylor, Columbus, Ohio, assignor to Standard Oil Company, Chicago, Ill., a corporation of Indiana Application September 20, 1952, Serial No. 310,663

2 Claims. (Cl. 286—9)

This invention relates to seals and is particularly designed and adapted for use in connection with rotary shafts and for use in sealing such shafts against excessive leakage of high pressure fluids.

The use of packed stuffing boxes for pressures of the order of 10,000 p. s. i. and higher is generally unsatisfactory. Soft packings usually do not wear long whereas metallic foil packings seriously score the shaft being sealed. Both types usually involve high power losses to friction. Heretofore an attempt has been made to avoid these difficulties by the use of a close fitting bushing-type seal where clearances are so small as to hold leakage within reasonable limits. However, a serious problem with this type of seal is the extremely small clearances required between shaft and bushing. These small clearances demand a quality of workmanship beyond the abilities of the usual machine shop or service department.

It is therefore a primary object of this invention to provide a seal that is not subject to wide variations depending on small variations of manufacturing precision. It is another object of the invention to provide a method and means whereby variations in manufacturing precision can be compensated. An additional object is to provide a seal which is equivalent or superior in performance to those requiring much higher manufacturing precision.

A further object of my invention is to provide a seal wherein the power losses due to friction would be less than for soft packing and with less likelihood of shaft overheating and seizure. It is also an object of the invention to provide an automatically adjustable seal which will allow axial movement of the shaft and to entail the loss of a minimum amount of sealing fluid. These and other objects of my invention will become apparent as the description thereof proceeds.

Briefly I attain the objects of my invention by providing a bushing which comprises a flexing cylinder. Around the cylinder is an annular space to which hydraulic fluid pressure is applied so that the bushing can be adjusted in order to reach a condition of small leakage. As the flexing cylinder may be comparatively thin to provide good pressure response I provide a concentric anti-buckling support which is of such strength as to bear the compressive load necessary to seal a lower gasket adjacent the rotating shaft. However, this seal is of the leaking-bushing type wherein a flow of lubricant or process fluid maintains lubrication to prevent shaft scoring and prevent damage of the walls of the flexing cylinder. The amount of this leakage is kept to a reasonable level by using small clearances. This seal provides a means of obtaining and regulating the desired leakage by flexing the bushing rather than by initially machining to close tolerances. Primarily this device is applicable to high pressure service where the required clearances are very small.

The seal requires two independent sources of high pressure fluid in addition to the process fluid being sealed.

One such source is introduced at slightly above process pressure below the flexing cylinder and above a back-leakage seal surrounding the shaft at its point of exit from a process vessel interior. The fluid thus introduced leaks out along the shaft in the close clearance between the shaft and the flexing cylinder. It is preferred that this fluid used for leakage be a lubricant such as an oil. If there is no objection to some leakage of process fluid and if it has lubricating properties the seal against back-leakage can be eliminated thus simplifying the overall construction. The second source of high pressure fluid is introduced into the annular space about the flexing cylinder. This fluid is at a pressure sufficiently high to cause the flexing cylinder to flex inward, thus reducing the clearance between the flexing cylinder and the shaft. This second source of fluid is statically sealed within the annular space surrounding the flexing cylinder and with good gasket seals at the top and bottom of the unit a small hand pump is sufficient to make the adjustment of the flexing cylinder.

Data for bushing seals show that the clearance for a seal of the type to which this invention relates is desirably less than about 0.001 inch on a radius. The importance of this is emphasized by the fact that theory shows the leakage to vary as the third power of this radial clearance. By my invention I can secure extremely fine clearances of the order of 0.0001 inch or less even though the original manufacturing of the shaft and flexing cylinder is only accurate to the order of 0.001 or 0.002 inch. Additional details of construction will be described in connection with the drawings wherein.

Figure 2:
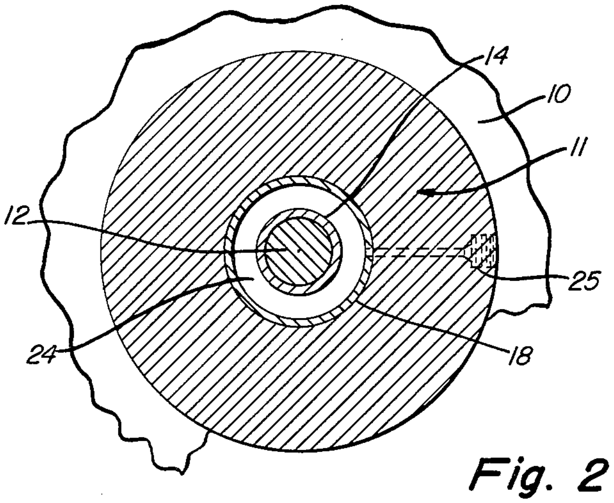
Figure 2 is a section taken along the line 2—2 in Figure 1.

In the drawing I have illustrated the invention as applied to a high pressure stirred autoclave having a wall 10 and an integral gland housing 11. The shaft 12 passes within the housing 11 and through the wall 10. A back leakage seal 13 about the shaft 12 includes a packing **13*a* and a gland nut 13*b***.

The shaft 12 is surrounded by a flexing bushing 14 which is illustrated as integral with bushing cap 15. A cap seal gasket 16 is provided between the end face of the housing 11 and the lower face of cap 15, with cap bolts 17 adapted to fix the cap 15 to the housing 11.

An anti-buckle support 18 is arranged within the housing chamber **11*a* and the upper end of the cylindrical support 18 enters a groove 19 on the lower face of the cap 15. The lower end of the anti-buckle support 18 engages a thrust ring 20 threaded to exteriorly threaded flange 21 carried by the lower end of the flexing bushing 14. A shoulder 22 on the periphery of the flange 21 is in a sliding fit with the inner surface of the cylindrical anti-buckle support 18. A shaft seal O-ring gasket 23 is interposed between the base of the gland housing 11 and the bottom face of flange 21 to prevent leakage from the annular space 24 toward the shaft 12**.

Figure 1:
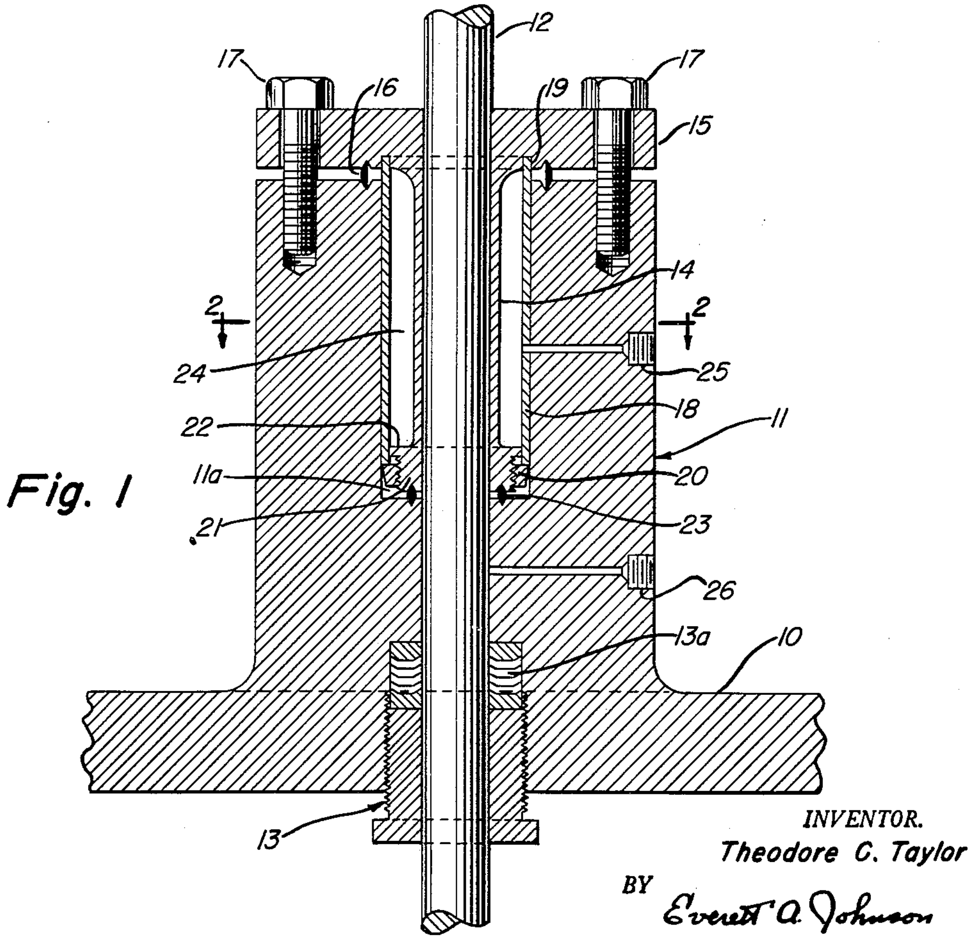
Figure 1 is an elevation partly in section.

The T-shaped unit comprising cylindrical anti-buckle support 18 is slipped over the annular shoulder 22 until the upper end of the support 18 is within groove 19 in cap 15. Thrust ring 20 is then threaded to the flange 21 until it is in firm engagement with the lower end of the support 18 as shown in Figure 1. The lower shaft seal gasket 23 and cap seal gasket 16 are then placed in position and the bushing unit slipped into the housing chamber **11*a*. The cap seal gasket 16 and the cap bolts 17 fix the unit in fluid-tight arrangement within the housing 11. This assembly provides an annular chamber 24 intermediate the flexing bushing 14 and the anti-buckle support 18. An adjusting fluid inlet 25 permits the entry of hydraulic fluid to the chamber 24 and permits the application of pressure to the flexing bushing 14 by means of a pump (not shown) thereby reducing the mean clearance between the shaft 12 and the bushing 14. The reduction in clearance is not necessarily uniform along the length of the bushing 14 but attains a maximum intermediate the mid-point and one end thereof. A back-leakage fluid supply inlet is provided at 26** through which the fluid flows around and along the shaft.

In a typical installation the housing 11 may be about 6 inches long and 4 inches in diameter. The shaft 12 may be about ⅝ inch in diameter; the bushing 14 about 4 inches long and a wall thickness of about ⅛ inch. A suitable bushing material is steel and an appropriate seal fluid is a light weight lubricating oil S. A. E. 10 lube oil. The inner diameter of the bushing 14 is machined with a uniform radial clearance of about 0.001 inch. With such a clearance the bushing would leak about 6 liters per hour at a vessel pressure of 15,000 p. s. i. However, by applying the flexing bushing according to my invention the oil leakage may be reduced to about ⅓ this quantity with 10,000 p. s. i. applied to the annular chamber 24. With a thinner flexing bushing 14, about 3/32 inch thick, 10,000 p. s. i. in the annular chamber 24 will reduce the oil leakage to about 1/12 the initial value.

Although my invention has been described with reference to a particular embodiment of an apparatus as applied to a rotating shaft it will be apparent to those skilled in the art that in view of my description the invention can be applied to any moving shaft and that changes may be made in the form of the apparatus without departing from the spirit of the invention as illustrated in the drawings and described above.

What I claim is:

1. A high pressure seal for a rotatable shaft comprising in combination a gland housing, a shaft-receiving bore in said housing, an enlargement in said bore adapted to receive an adjustable bushing, means including a cap for said housing, a thin flexible cylindrical bushing integral with said cap and extending within said enlargement, a flange means on the end of said bushing remote from said cap, an annular recess in said cap concentric with the axis of said bushing, a rigid fluid-impervious cylindrical anti-buckle support having one end in said annular recess in said cap and the other supported by said flange means, said support having an internal diameter which is substantially greater than the external diameter of said bushing, and conduit means extending through said housing and through said cylindrical support for admitting fluid under hydraulic pressure to the annular space between said bushing and said support.

2. A high pressure seal for a rotating shaft comprising in combination a gland housing, a shaft-receiving bore in said housing, a thin flexible cylindrical bushing supported within said bore and in close running fit with said shaft, an annular cap for said housing integral with said flexible bushing, an exterior flange means on the lower end of said bushing, a rigid cylindrical fluid-impervious anti-buckle support extending between the underside of said cap and the said flange means, a thrust ring carried by said flange means and adjustably engaging said support, said support being arranged concentrically of said bushing and in close fitting arrangement with the walls of said housing, the internal diameter of said support being substantially greater than the exterior of said busing thereby providing an annular cavity, and conduit means for applying hydraulic pressure within said cavity between said bushing and said anti-buckle support whereby said bushing is maintained in the desired close running fit with said shaft.

References Cited in the file of this patent

UNITED STATES PATENTS

| | | |
|---|---|---|
| 72,340 | Turner | Dec. 17, 1867 |
| 344,349 | Clark | June 29, 1886 |
| 1,463,169 | Lowinger | July 31, 1923 |
| 2,307,575 | Davis | Jan. 5, 1943 |
| 2,366,824 | Zimmerman | Jan. 9, 1945 |